United States Patent [19]
Schwanz et al.

[11] 3,942,819
[45] Mar. 9, 1976

[54] SAFETY BELT TENSIONING DEVICE

[75] Inventors: Wilfried Schwanz; Ernst Fiala, both of Braunschweig; Rolf Warnecke, Ribbesbuttel; Peter Buchholz, Braunschweig, all of Germany

[73] Assignee: Volkswagenwerk Aktiengesellschaft, Wolfsburg, Germany

[22] Filed: Dec. 19, 1974

[21] Appl. No.: 534,364

Related U.S. Application Data

[62] Division of Ser. No. 299,783, Oct. 24, 1972, Pat. No. 3,871,470.

[52] U.S. Cl. .......................... 280/150 SB; 180/82 C
[51] Int. Cl.² ........................................ B60R 21/10
[58] Field of Search .............. 280/150 SB; 180/82 C

[56] References Cited
UNITED STATES PATENTS

| | | | |
|---|---|---|---|
| 2,825,581 | 3/1958 | Knight | 280/150 SB |
| 3,178,136 | 4/1965 | Bayer | 280/150 SB |
| 3,804,430 | 4/1974 | Fiala | 280/150 SB |

Primary Examiner—Robert R. Song
Attorney, Agent, or Firm—Brumbaugh, Graves, Donohue & Raymond

[57] ABSTRACT

The invention concerns an apparatus for tensioning restraining devices, such as safety belts. The tensioning is effected by a piston arranged to move within a cylinder when actuated by a pressure medium. A return stopping device is provided to maintain tension after actuation.

3 Claims, 5 Drawing Figures

SAFETY BELT TENSIONING DEVICE

This is a division of application Ser. No. 299,783, filed Oct. 24, 1972, now U.S. Pat. No. 3,871,470.

BACKGROUND OF THE INVENTION

Safety belts are effective only if they succeed in protecting the occupants of a vehicle from being thrust against interior parts of the vehicle while keeping the forces exerted on the occupants' bodies within tolerable limits. Although an enlargement of the interior space of a vehicle may be a solution to the problem, a satisfactory increase in size is often economically impractical.

The forces exerted by safety belts may be limited by using expansion (elastic) elements of the type disclosed in the French Patent No. 1,180,364, but such an arrangement leads to an increase in the forward displacement of the vehicle occupants during rapid deceleration. The use of elastic elements must therefore be accompanied by an enlargement of the vehicle interior.

Another possibility for improving safety belt effectiveness is to tighten the belts (within tolerable tension limits) at the moment that the restraining force of the belts is needed. Currently known automatic belt winders with centrifugal weights are unsatisfactory for this purpose, however, particularly when the vehicle is involved in a multiple impact accident or overturns. This type of belt tensioning device releases the safety belts after tightening thus defeating the desired restraining action.

SUMMARY OF THE INVENTION

It is a general object of the present invention to provide apparatus for tensioning a restraining device, such as a safety belt, when an increased restraining force is needed.

More particularly, it is an object of the present invention to provide apparatus for rapidly tightening a safety belt or belts around the bodies of the occupants of a vehicle with an appropriate but not excessive tension as soon as an increase in tension is needed, so that the vehicle occupants may participate in the deceleration of the vehicle with a minimum of forward displacement.

These objects, as well as other objects which will become apparent in the discussion that follows, are achieved, according to the present invention, by providing a piston which may be moved within a cylinder when tensioning is desired, and means for translating movement of the piston into a tensioning of the safety belt or belts. In addition, a stopping or locking device is provided for maintaining the increased safety belt tension, once applied, in order to prevent the vehicle occupants from falling free in the direction of travel in the event of continued deceleration. Such a stopping device is especially important in accidents in which the vehicle undergoes several successive impacts, as may occur, for example, if the vehicle skids against trees or turns over.

In a preferred embodiment of the present invention, the apparatus includes a selectively releasable pressure medium for driving the piston within the cylinder, and one or more sensors for releasing the medium at the appropriate time. The sensors may be arranged on the bumper or body of the vehicle and may be connected either in series or parallel.

Any device which will generate a signal when the vehicle is out of control may be used as a sensor. The pressure produced by a hydraulic impact absorber that absorbs bumper energy may be used to trigger release of the pressure medium. Inertia sensors of the type employed to release the well known "air bag" or conventional sensors such as those found in automatic belt winding devices may also be used. It should be noted, however, that it is only useful to release the pressure medium for speed changes at which the protective effect of a non-tensioned belt is insufficient. This condition occurs with speed changes of about 25 miles per hour.

In a particular embodiment of the present invention the cylinder is provided with discharge slits for the purpose of piston speed control. By properly dimensioning and positioning the discharge slits and by properly dimensioning the piston mass, diameter and path of travel it is possible to achieve the appropriate tensioning force in the safety belt. The tensioning force is principally a function of the kinetic energy stored by the piston as it is accelerated along its path of travel. After the initial slack in the safety belt is taken up — i.e., after the belt is tightened against the bodies of the vehicle occupants — this kinetic energy is converted into potential energy of tension due to the inherent elasticity of the seat belt system.

As is noted above, the apparatus according to the present invention is provided with a stopping or locking device to prevent the undesired release of the safety belt or belts after tensioning. This stopping device operates directly on the piston connecting rod in one embodiment of the invention. The rod is surrounded by at least two gripping jaws which have an outer diameter tapering conically inward in the direction of locking. These gripping jaws are surrounded and guided by jaw closing elements arranged in the cylinder and having an inner diameter matching the contour of the gripping jaws. Anti-friction roller elements are arranged between the gripping jaws and the jaw closing elements. In order to insure an effective grip, at least one spring is arranged between the gripping jaws and an abutment surface in the cylinder to bias the gripping jaws in the direction of locking.

In another embodiment of the present invention a safety belt winding roller is utilized. The roller is provided with a thumb which projects into the path of piston travel and acts as a drive element. When the piston is moved it pushes the thumb thereby driving the roller in the winding direction tending to tension the safety belt. Preferably, the piston path has a conical end for slowing the piston at the end of its travel.

A rotatable shaft is provided and frictionally supported at an end thereof inside the safety belt winding roller. The other end of the shaft is provided with a rachet wheel which engages a pawl attached to the roller casing. This shaft, ratchet wheel and pawl operate as the stopping device to maintain tension on the safety belt after the tensioning apparatus has been actuated.

In order to reduce the noise of actuation a muffler may be arranged on the cylinder.

The principal advantage of the apparatus according to the present invention is its adaptability to any type of seat belt system. First, the apparatus may be retrolifted in existing safety belt systems without difficulty. Second, the apparatus is especially suitable for so-called "passive" belt systems wherein a large amount of slack must be overcome during tensioning. Finally, the apparatus easily lends itself to use in combination with belt force limiting devices. In this case, not only the belt force limiting device according to the invention, but also any prior art device may be used.

DESCRIPTION OF THE PREFERRED EMBODIMENTS

Figure 1:
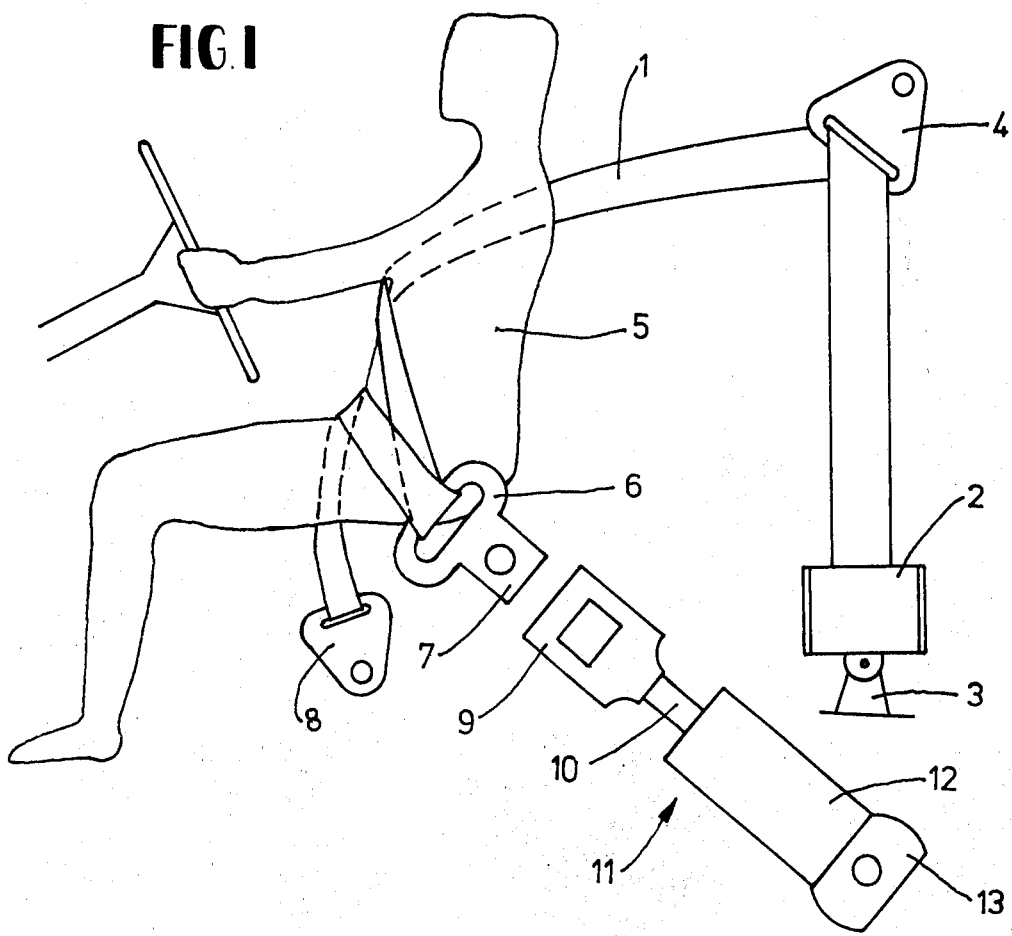
FIG. 1 is a diagram of a standard three-point safety belt with an automatic belt winding device and a belt tensioning device in accordance with the present invention.

The preferred embodiments of the present invention will now be described in connection with FIGS. 1–5. Identical elements in the various figures are indicated by the same reference numerals.

FIG. 1 shows a three-point safety belt 1 which extends from an automatic belt winding device 2, supported by an element 3 on the side of the vehicle body, through a fastening element 4 at shoulder height of the occupant 5 through a traverse fitting 6 with a fishplate 7 and from there to a fastening point element 8 for the pelvic belt part. The automatic belt winding device 2 essentially consists of a spring-loaded roller (not shown) which is locked by the acceleration of the vehicle, and/or the drawn-out belt. It is designed in such a manner that the lock is not released even when the vehicle overturns or is involved in successive collisions.

The belt system shown may also be suitably coupled with a belt force limiter.

The fishplate 7 engages a beltlock 9 which is fastened to the connecting rod 10 of a tensioning device 11. The tensioning device 11 is connected to the vehicle by means of an eye plate 13 attached to the cylinder 12.

Figure 2:
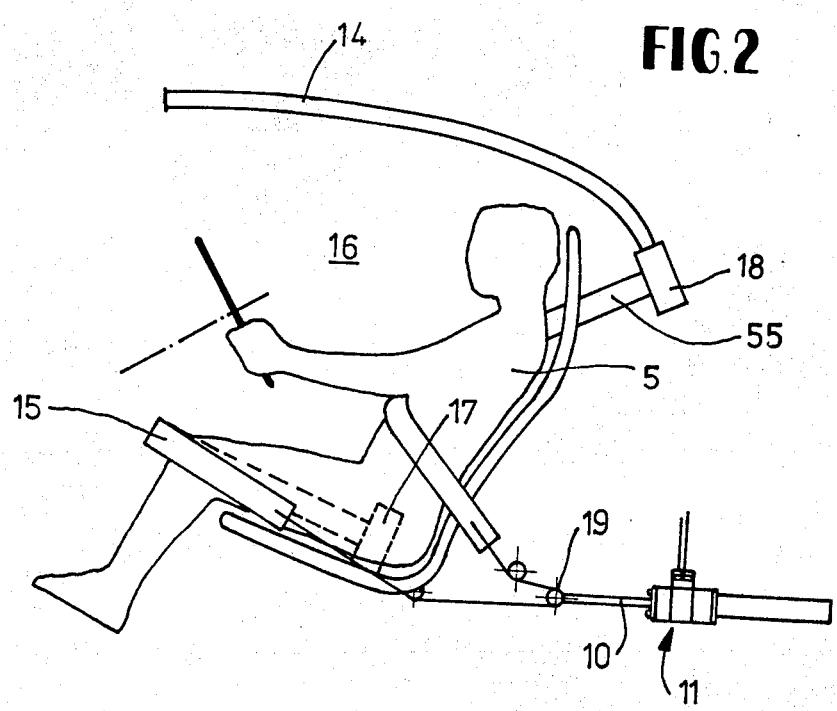
FIG. 2 is a diagram of a passive safety belt system consisting of inclined shoulder and knee belts and a modified arrangement of a belt tensioning device according to the present invention.

FIG. 2 shows a passive safety belt system which is provided with a tensioning device according to the present invention. The tensioning device finds particular advantageous use with a system of this type since it is able to take up a large amount of safety belt slack. In this arrangement the occupant 5 is held back by a combined inclined shoulder and knee belt. The inclined shoulder belt 55 is guided by means of a belt guide 14 that is arranged in a side portion of the body of the vehicle. The knee belt 15 is hinged to the vehicle door 16 by means of a belt force limiter 17 and/or an automatic belt winding device either or both of which may be provided with a quick-disconnect device to enable speedy opening of the door. An additional belt force limiter 18 can be arranged at the connection between the inclined shoulder belt 55 and the belt guide 14.

The inclined shoulder belt is joined to the knee belt by suitable connecting means which is passed around a belt guide 19 attached to the connecting rod 10. This arrangement enables tensioning of both shoulder and knee belts by use of one tensioning device.

Figure 3:
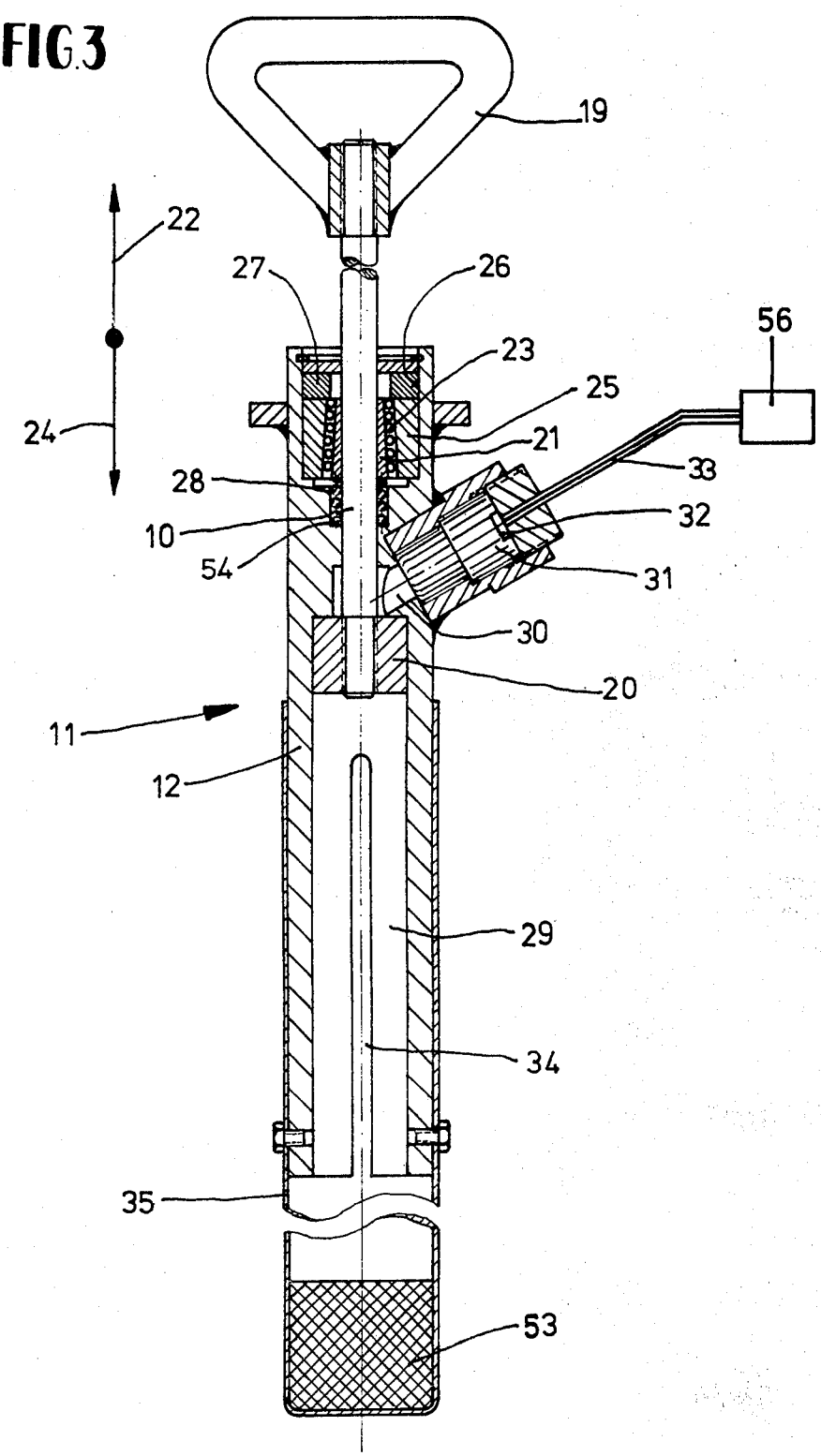
FIG. 3 is a cross-sectional view of the belt tensioning device illustrated in FIGS. 1 and 2.

FIG. 3 illustrates one embodiment of the tensioning apparatus in cross-section. The belt guide 19 is fastened to one end of the connecting rod 10. The other end thereof is secured to a piston 20 which is arranged for movement within the cylinder 12.

The connecting rod 10 is surrounded by components of the return stopping device. This device includes gripping jaws 21 and surrounding jaw closing elements 25 which are held in an enlarged portion 26 of the cylinder 12 by suitable fastening means 27. The outer diameter of the gripping jaws 21 and the inner diameter of the closing elements 25 taper conically inward in the direction of locking 22. Roller elements 23 are interposed between the gripping jaws 21 and the closing elements 25 to minimize friction. The gripping jaws 21 are biased in the direction of locking 22 by means of a spring 26 which is pressed against an abutment surface 54 of the cylinder 12.

A propellant or explosive charge 31 is connected with the internal cylinder space 29 through a conduit 30 in the cylinder wall. A firing or releasing device 32 in the propellant charge 31 is controlled by a line 33 and a suitable sensor 56. The cylinder 12 is provided with discharge slits 34 to control the velocity of the piston 20 and a shock absorber 55 to buffer the piston 20 when the belt is not attached around the body of a vehicle occupant. A muffler 35 is attached to the cylinder 12 to absorb the sound during operation.

Figure 4:
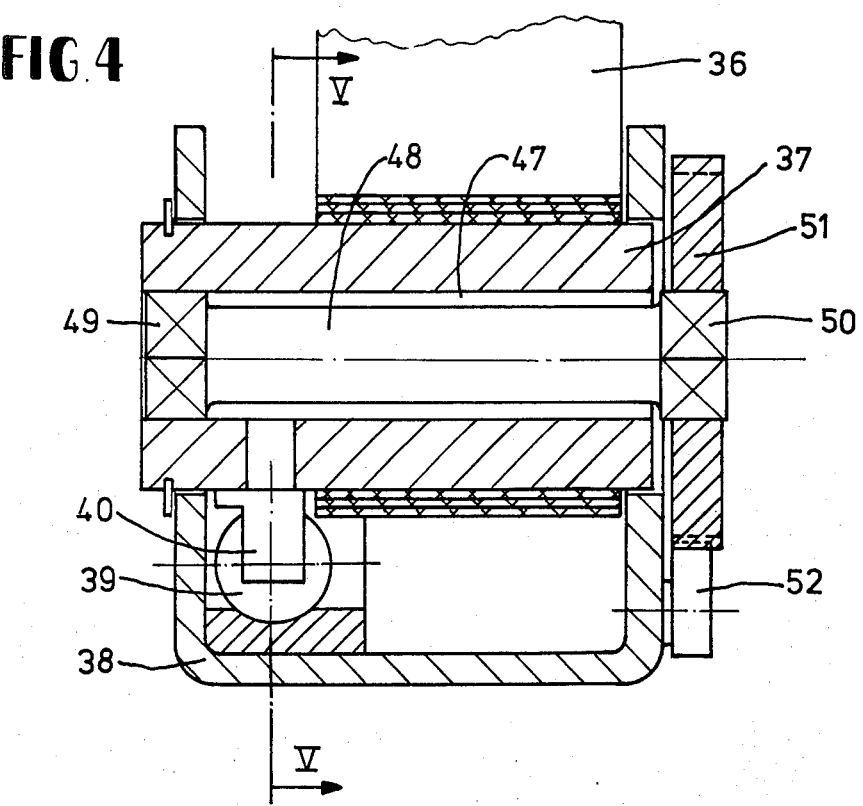
FIG. 4 is a cross-sectional view of a belt tensioning device which utilizes a belt winder.
Figure 5:
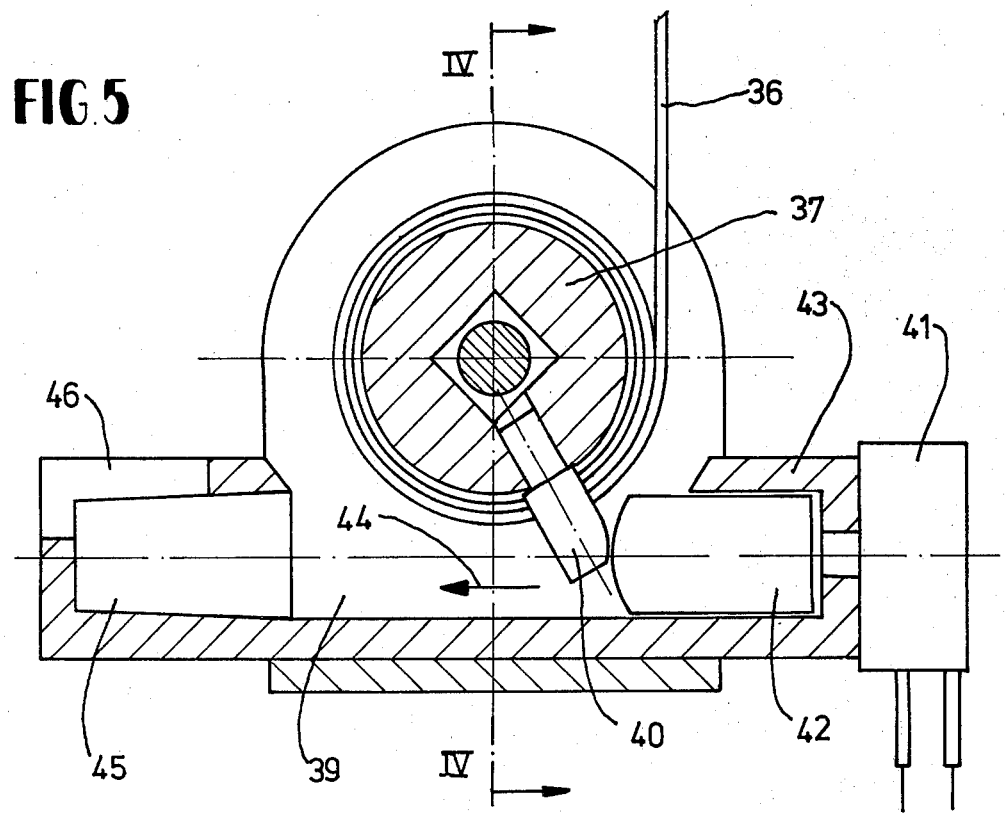
FIG. 5 is a cross-sectional view of the device of FIG. 4, taken along the line V—V.

FIGS. 4 and 5 show another embodiment of a safety belt tensioning device according to the present invention. In this embodiment the safety belt 36 is partially wound around a safety belt winding roller 37 which pivots in a support frame or casing 38. On the safety belt winding roller 37 is arranged a thumb 40 which projects into the path of piston travel 39 and acts as a crank element to transfer piston motion to the winding roller 37. When the propellant charge 41 is activated, a pressure medium is released causing the piston 42 to accelerate in the cylinder 43 in the direction 44 and delivering, by way of the thumb 40, an angular impulse to the winding roller 37. The piston 42 moves in a straight line until stopped by a buffer cylinder 45, which may, if desired, have a conical shape. The buffer cylinder also is provided with discharge slits 46 for velocity control of the piston 42 and a muffler (not shown) to absorb the sound.

The angular momentum delivered by the thumb 40 to the safety belt winding roller 37 results in a circumferential roller speed of 50 to 100 m/sec., causing the desired tightening of the safety belt 36.

The interior of the safety belt winding roller 37 is provided with a torsion bar 48 which is frictionally connected with the safety belt winding roller 37 at one of its ends 49 and connected at its other end 50 to a ratchet wheel 51. A pawl 52, attached to the casing 38, engages the ratchet wheel 51 so as to maintain tension in the safety belt after tensioning. The torsion bar 48 limits the amount of tension maintained since it twists whenever the belt tension exceeds its strain limit.

The tensioning apparatus shown in FIGS. 4 and 5 and can be placed at either all the end points or at the belt lock point of a three-point belt, or can be added to any system which utilizes an automatic belt-winding device. The belt end at the lock point of a so-called Y-belt also can be tensioned by means of this apparatus.

It will be understood that the above description of the present invention is susceptible to various modifications, changes and adaptations as will occur to those skilled in the art. It is therefore intended that the scope of the invention be limited only by the following claims.

We claim:

1. Apparatus for tensioning a safety belt when actuated, comprising, in combination:
   a. piston means;
   b. cylinder means, surrounding said piston means, for applying a force to cause said piston means to move therein upon actuation;
   c. intermediate means, connecting said piston means to the safety belt, for tensioning the safety belt upon movement of said piston, said intermediate means comprising roller means for winding said safety belt and drive means coupled to said roller means and, projecting into the path of travel of said piston means, for rotating said roller means upon actuation of said piston means; and
   d. return stop means for maintaining tension in the safety belt after tensioning by said intermediate means.

2. The apparatus defined in claim 1, further comprising conical cylinder means, arranged at the end of the path of travel of said piston means, for slowing said piston means at the end of its travel.

3. The apparatus defined in claim 1, wherein said return stop means includes (1) a torsion bar arranged within said roller means, said bar being supported in said roller means at one of its ends, (2) a ratchet wheel attached to the other end of said torsion bar and (3) pawl means, attached to the casing of said roller means and arranged for engagement with said ratchet wheel, for preventing rotation of said ratchet wheel in the direction of locking.

* * * * *

UNITED STATES PATENT AND TRADEMARK OFFICE
CERTIFICATE OF CORRECTION

PATENT NO. : 3,942,819
DATED : March 9, 1976
INVENTOR(S) : Wilfried Schwanz et al.

It is certified that error appears in the above-identified patent and that said Letters Patent are hereby corrected as shown below:

First page, following Item [62], insert:

--[30] Foreign Application Priority Data    May 12, 1972 Germany    2223061--;

Col. 1, line 64, after "within" delete the comma;

Col. 4, line 17, "26" should read --28--;

Col. 4, line 25, "55" was changed to --53-- in parent appln.;

Col. 5, line 14, after "means" insert a comma; and

Col. 5, line 15, after "and" delete the comma.

Signed and Sealed this first Day of June 1976

[SEAL]

Attest:

RUTH C. MASON
Attesting Officer

C. MARSHALL DANN
Commissioner of Patents and Trademarks